(12) United States Patent
Shrestha et al.

(10) Patent No.: US 12,294,442 B2
(45) Date of Patent: May 6, 2025

(54) PRECONFIGURED UPLINK RESOURCE (PUR) VALIDATION IN NON-TERRESTRIAL NETWORKS

(71) Applicant: QUALCOMM INCORPORATED, San Diego, CA (US)

(72) Inventors: Bharat Shrestha, San Diego, CA (US); Umesh Phuyal, San Diego, CA (US); Mungal Singh Dhanda, Slough (GB); Ayan Sengupta, San Diego, CA (US); Liangping Ma, San Diego, CA (US); Alberto Rico Alvarino, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/707,140

(22) Filed: Mar. 29, 2022

(65) Prior Publication Data

US 2022/0321206 A1    Oct. 6, 2022

Related U.S. Application Data

(60) Provisional application No. 63/169,562, filed on Apr. 1, 2021.

(51) Int. Cl.
*H04B 7/185* (2006.01)
*H04B 7/06* (2006.01)
*H04W 64/00* (2009.01)

(52) U.S. Cl.
CPC ....... *H04B 7/18513* (2013.01); *H04B 7/0695* (2013.01); *H04W 64/003* (2013.01)

(58) Field of Classification Search
CPC ........ H04B 7/185–195; H04B 7/18513; H04B 7/0695; H04W 64/003
See application file for complete search history.

(56) References Cited

U.S. PATENT DOCUMENTS

2019/0342045 A1* 11/2019 Radulescu .......... H04L 27/0006
2022/0029764 A1*  1/2022 Liou ..................... H04L 5/0094
(Continued)

FOREIGN PATENT DOCUMENTS

WO    2022036640 A1    2/2022

OTHER PUBLICATIONS

International Search Report and Written Opinion—PCT/US2022/022413—ISA/EPO—Jul. 7, 2022.
(Continued)

*Primary Examiner* — Raymond S Dean
(74) *Attorney, Agent, or Firm* — Haynes and Boone, LLP

(57) ABSTRACT

A method for wireless communication includes validating a PUR configuration in a NTN based on location-related information associated with a satellite. For example, a UE may determine, based on location-related information of a satellite in a non-terrestrial network, whether a preconfigured uplink resource (PUR) configuration is valid. The UE may also transmit, to a base station (BS) via the satellite in response to determining that the PUR configuration is valid, a communication signal in a PUR. For example, the UE may determine, based on the location-related information associated with the satellite, if the parameter satisfies the threshold, and transmit UL data in a PUR occasion based on the determined parameter satisfying the threshold.

28 Claims, 9 Drawing Sheets

(56) References Cited

U.S. PATENT DOCUMENTS

2022/0159601 A1* 5/2022 Mayer .................. H04J 3/0641
2022/0232503 A1* 7/2022 Cheng ............... H04W 56/0045
2022/0295225 A1* 9/2022 Keating ................ H04W 4/029

OTHER PUBLICATIONS

Lenovo, et al., "Considerations on PUR in IoT NTN", 3GPP Draft, 3GPP TSG-RAN WG2 Meeting #113 electronic, R2-2101130, 3rd Generation Partnership Project (3GPP), Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021 (Jan. 15, 2021), XP051974127, 2 Pages, Retrieved from the Internet: URL: https://ftp.3gpp.org/tsg_ran/WG2_RL2/TSGR2_113-e/Docs/R2-2101130.zip R2-2101130 Considerations on PUR in IoT NTN.docx [Retrieved on Jan. 15, 2021] The Whole Document.

Oppo: "Discussion on UP Issues for IoT Over NTN", 3GPP Draft, 3GPP TSG-RAN WG2 Meeting #113 electronic, R2-2100165, 3rd Generation Partnership Project (3GPP), Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021 (Jan. 15, 2021), XP051973378, 5 Pages, Retrieved from the Internet: URL: https://ftp.3gpp.org/tsg_ran/WG2_RL2/TSGR2_113-e/Docs/R2-2100165.zip R2-2100165—Discussion on UP Issues for IoT Over NTN.doc [Retrieved on Jan. 15, 2021] p. 4.
Samsung: "On Timing Relationship Enhancements", 3GPP Draft, 3GPP TSG RAN WG1 #104-e, R1-2101244, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), XP051971457, 3 Pages, Retrieved from the Internet: URL: https://ftp.3gpp.org/tsg_ran/WG1_RL1/TSGR1_104-e/Docs/R1-2101244.zip R1-2101244.docx [Retrieved on Jan. 19, 2021] p. 2.

* cited by examiner

PRECONFIGURED UPLINK RESOURCE (PUR) VALIDATION IN NON-TERRESTRIAL NETWORKS

CROSS-REFERENCE TO RELATED APPLICATIONS

The present applications claims the benefit of and priority to U.S. Provisional Patent Application No. 63/169,562, filed Apr. 1, 2021, the entirety of which is incorporated by reference herein.

TECHNICAL FIELD

The present disclosure is directed to wireless communication systems and methods. Certain aspects provide techniques to validate preconfigured uplink resources (PURs) in a non-terrestrial wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A 5G network may be terrestrial, non-terrestrial, or a combination of both terrestrial and non-terrestrial. In Non-terrestrial networks (NTNs), a satellite or other airborne device (e.g., high-altitude balloon) may act as a wireless node to relay communications to and from a UE and a BS. The satellite may provide for a wider coverage area in regions of the world where ground-based infrastructure is not practical.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure describes mechanisms for validating a preconfigured uplink resources (PUR) configuration in a Non-terrestrial networks (NTN) based on location information provided by a satellite. For example, a UE may determine a timing advance, frequency compensation, or other parameter based on at least one of a location or a velocity of the satellite, and determine whether the parameter satisfies a configured threshold. If the parameter satisfies the threshold, the UE may transmit in a PUR based on the determined parameter. Accordingly, using location and/or velocity information of the satellite, which may be broadcast, the UE can determine and use one or more parameters that may be associated with a likelihood that a timing- and/or frequency-compensated PUR communication will be successfully received by the satellite, and subsequently the BS.

One aspect of the present disclosure includes a method for wireless communication performed by a user equipment (UE). The method includes determining, based on location information of a satellite in a non-terrestrial network, whether a preconfigured uplink resource (PUR) configuration is valid. The method also includes transmitting, to a base station (BS) via the satellite in response to determining that the PUR configuration is valid, a communication signal in a PUR.

One aspect of the present disclosure includes a user equipment (UE) that includes a memory, a transceiver, and a processor coupled with the memory. The processor is configured, when executing instructions stored on the memory, to cause the UE to: determine, based on location information of a satellite in a non-terrestrial network, whether a preconfigured uplink resource (PUR) configuration is valid; and transmit, via the transceiver to a base station (BS) via the satellite in response to determining that the PUR configuration is valid, a communication signal in a PUR.

One aspect of the present disclosure includes a non-transitory computer-readable medium having program code recorded thereon. The program code includes code for causing a user equipment (UE) to determine, based on location information of a satellite in a non-terrestrial network, whether a preconfigured uplink resource (PUR) configuration is valid. The program code also includes code for causing the UE to transmit, to a base station (BS) via the satellite in response to determining that the PUR configuration is valid, a communication signal in a PUR.

One aspect of the present disclosure includes a user equipment (UE). The UE includes means for determining, based on location information of a satellite in a non-terrestrial network, whether a preconfigured uplink resource (PUR) configuration is valid. The UE also includes means for transmitting, to a base station (BS) via the satellite in response to determining that the PUR configuration is valid, a communication signal in a PUR.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
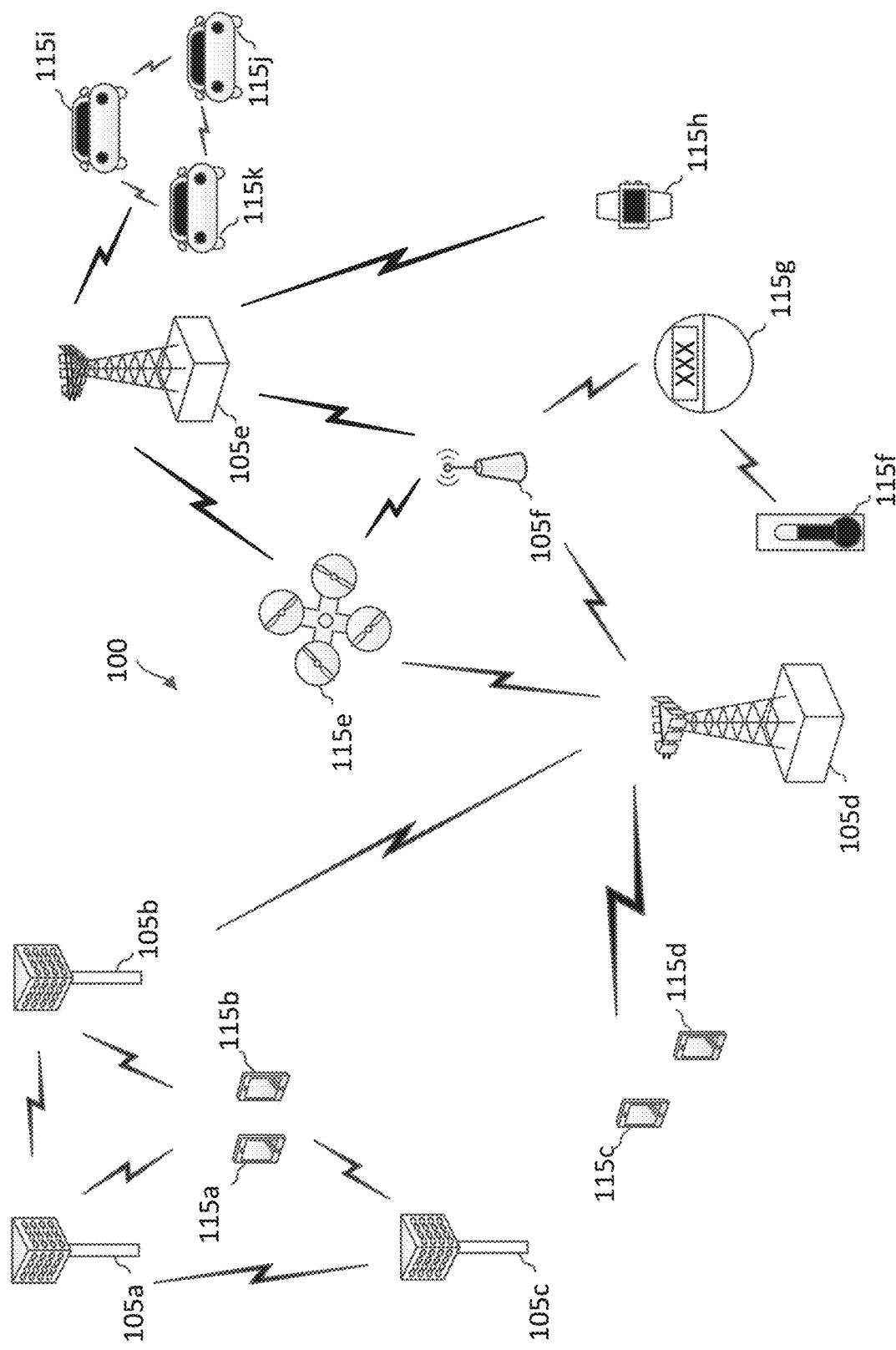
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR includes features to facilitate communication for low-power devices, such as industrial sensors. For example, NarrowBand-Internet of Things (NB-IoT) is a low power wide area network (LPWAN) technology that enables low power communications for IoT devices. An NB-IoT device (e.g., a UE) may be configured with preconfigured uplink resources (PURs) that allow the UE to transmit in a physical uplink shared channel (PUSCH) without performing a random access channel (RACH) procedure while the UE is in and idle mode. The PUR may indicate a periodic set of time and frequency resources for the UE. The periodicity of the instances of the PUR may be relatively large (e.g., 81.92 seconds or longer). Although RACH procedures may not be used to send communications in PUR, the PUR configuration may be validated before a communication is sent in a PUR occasion.

In some scenarios, a user equipment (UE) may operate in an idle mode. Before transmitting in a preconfigured uplink resource (PUR) in a terrestrial network while operating in the idle mode, the UE validates the PUR configuration using a timer-based approach or a reference signal received power (RSRP) approach. For example, the UE may determine whether one or more RSRP measurements are valid measurements, and whether a timing alignment validation is valid. However, these validation schemes may not be useful or practical in NTNs. For example, in NTN, because the distance between the UE and the satellite may be far greater than the distance between UEs and BSs in a terrestrial network, the UE may determine a temporal and/or frequency pre-compensation and/or a timing advance before transmitting a UL transmission in a PUR. Further, RSRP may not vary much in a NTN cell. Accordingly, the present disclosure provides other approaches to validating PUR configurations in NTNs.

According to some aspects, a UE may validate a PUR configuration in a NTN based on location information provided by the satellite. For example, a UE may determine a timing advance, frequency compensation, or other parameter based on at least one of a location or a velocity of the satellite, and may determine whether the parameter satisfied a configured threshold. If the parameter satisfies the threshold, the UE may transmit in a PUR based on the determined parameter. Accordingly, using location and/or velocity information of the satellite, which may be broadcast, the UE can determine and use one or more parameters that may be associated with a likelihood that a timing- and/or frequency-compensated PUR communication will be successfully received by the satellite, and subsequently the BS.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

A UE 115 may be configured with preconfigured uplink resources (PURs) that allow the UE 115 to transmit in a physical uplink shared channel (PUSCH) without performing a random access channel (RACH) procedure while the UE 115 is in and idle mode. The PUR may indicate a periodic set of time and frequency resources for the UE 115, which may be referred to as PURs or PUR occasions. The periodicity of the instances of the PUR occasions may be relatively large (e.g., 81.92 seconds or longer). Although RACH procedures may not be used to send communications in PUR, the PUR configuration may be validated before a communication is sent in a PUR occasion.

In terrestrial networks while operating in the idle mode, the UE 115 may validate the PUR configuration using a timer-based approach or a reference signal received power (RSRP) approach. For example, the UE 115 may determine or measure a signal power of communications received by the BS 105 and/or the satellite 110, to determine whether the received signal power (RSRP) is within an acceptable range, or if the signal power has changed such that the time/frequency resources indicated in the PUR configuration are no longer useful or likely to result in successful transmission.

In some aspects, the network 100 may include non-terrestrial wireless nodes or devices, such as satellites (e.g., low-earth orbit (LEO), geosynchronous equatorial orbit (GEO)), high-altitude balloons, or other non-terrestrial devices. For example, the network 100 may include one or more satellites configured to relay communications between a BS 105 and a UE 115. The satellites may provide for larger coverage areas for a group of UEs, and may provide coverage in regions where fixed terrestrial BSs are not practical. Further, the UE 115 may be provided with a preconfigured uplink resource (PUR) configuration, which indicates periodic time/frequency resources for transmitting UL communications in a PUSCH without performing a random access channel (RACH) procedure while the UE 115 is in an idle mode. The UE may be configured to validate the PUR configuration based on one or more criteria associated with the propagation delay or frequency shift associated with a potential PUR communication. In this regard, the UE 115 may be configured to validate the PUR configuration based on location information provided by the satellite. The UE 115 may determine a timing advance (TA), frequency compensation, UE-to-satellite distance, or other suitable parameter, and compare the parameter or a change in the parameter to a threshold. If the parameter satisfies the threshold, the UE 115 may validate the PUR configuration and transmit the UL communication in the PUR to the satellite. In some aspects, the UE 115 may perform the PUR validation each time the UE has UL data for transmission in a PUR.

Figure 2:
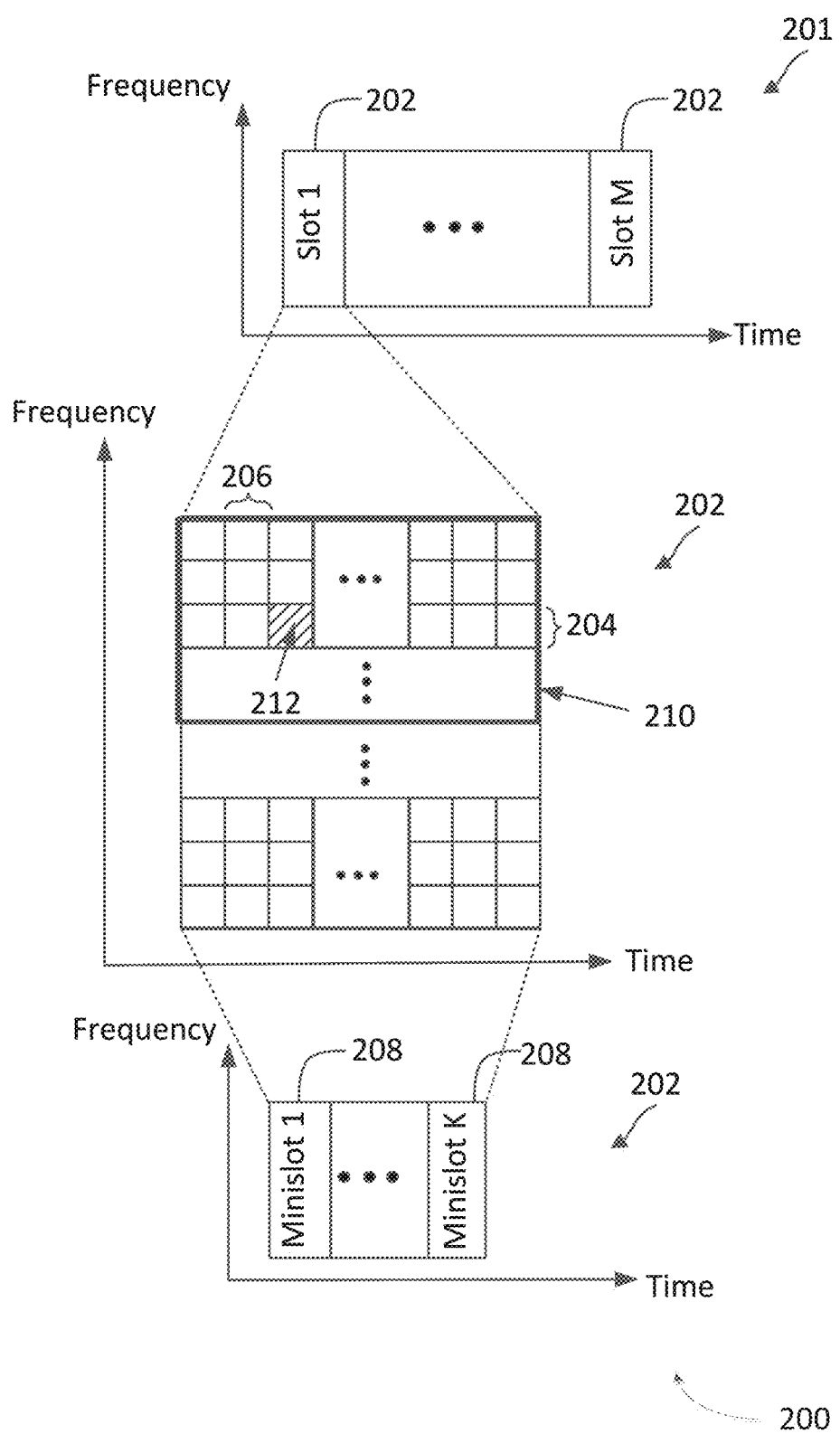
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
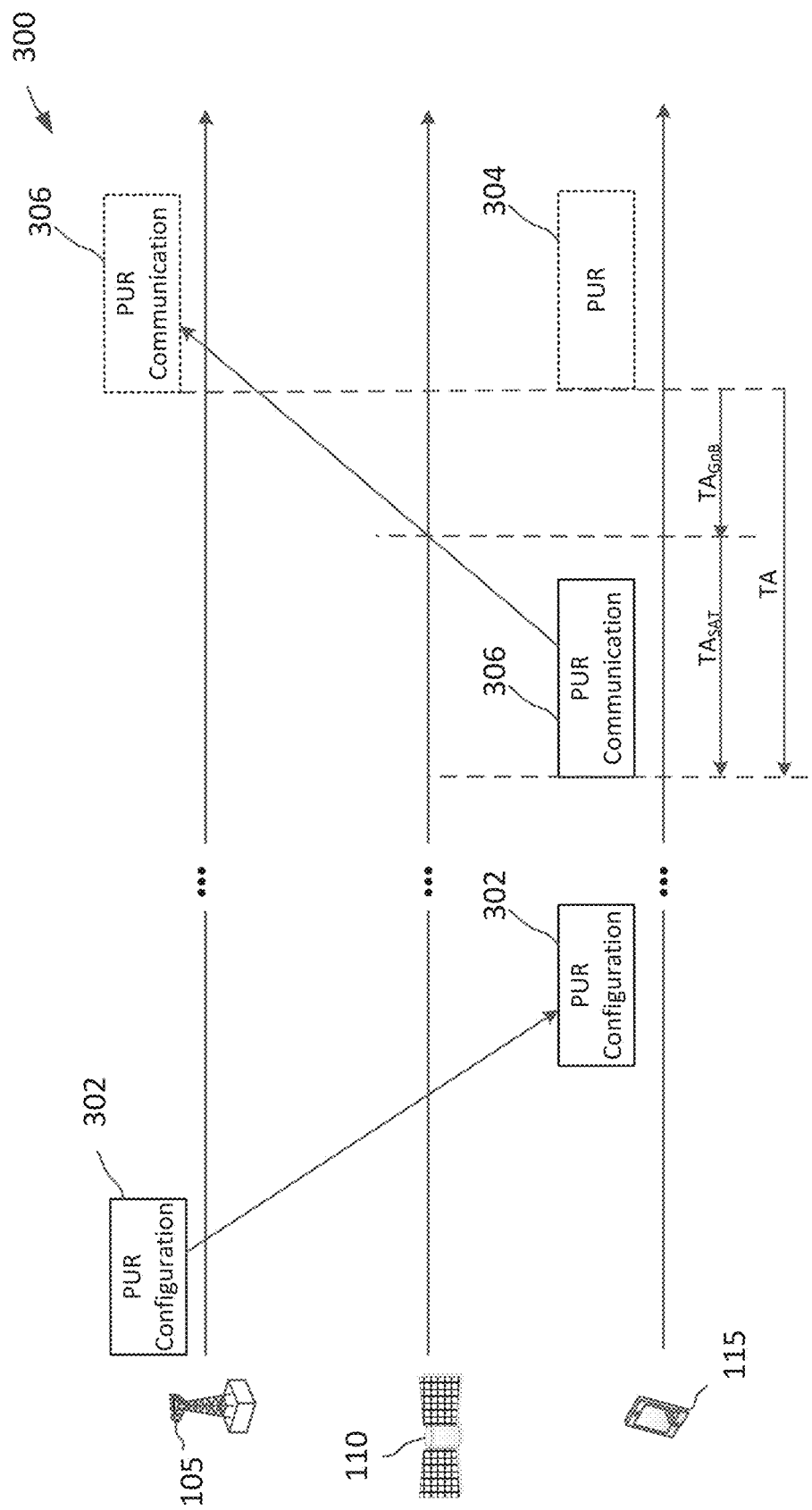
FIG. 3 illustrates a preconfigured uplink resource (PUR) communication scheme with propagation delay compensation using a timing advance according to some aspects of the present disclosure.

FIG. 3 is a timing diagram illustrating a PUR communication scheme 300 with propagation delay compensation using a timing advance, according to some aspects of the present disclosure. The scheme 300 may be employed by BSs such as the BSs 105 and UEs such as the UEs 115 in a network such as the network 100 for communications. In the scheme 300, a BS 105 communicates with a UE 115 through a satellite 110. Accordingly, communications sent from the BS 105 to the UE 115 are first transmitted to the satellite 110, which transmits or relays the communication to the UEs 115. For example, the BS 105 transmits a PUR configuration 302 to the UE 115 via the satellite 110. The transmission of the PUR configuration 302 may have a propagation delay due to the distance between the BS 105 and the satellite 110, and between the satellite 110 and the UE 115.

The PUR configuration 302 includes or indicates one or more parameters for the UE 115 to use the PUR. The PUR configuration 302 indicates a set of periodic time and/or frequency resources in which the UE 115 can transmit UL data in a PUSCH without first performing a RACH procedure, and while the UE is in an idle mode. For example, the PUR configuration 302 may indicate the time and/or frequency locations of the set of periodic time and/or frequency resources, which may be referred to as PURs or PUR occasions. Each PUR in the set may occupy one or more symbols (e.g., the symbols 206) in time and/or one or more subcarriers (e.g., the subcarriers 204) in frequency. In some aspects, a PUR is a PUSCH resource preconfigured for UL transmission by the UE 115. In some instances, the PUR configuration 302 may indicate the time first slot and/or symbol, subcarrier frequency, periodicity, or other parameters which the UE 115 can use to transmit UL data in a PUR occasion 304 or instance. The parameters of the PUR configuration 302 may include timing advance validation parameters, PUR identity, PUR start time etc.

Because the UE 115 is operating in a non-terrestrial network (NTN), the PUR configuration 302 may also specify one or more validation parameters used to validate the PUR configuration 302. The PUR configuration 302 may also specify one or more thresholds or reference values the UE may use to validate the PUR configuration 302 before transmitting UL data in the PUR occasion 304. For example, the PUR configuration 302 may indicate to the UE 115 to use a timing advance (TA), which is associated with a propagation delay for transmitting a communication from the UE 115 to the BS 105 via the satellite 110. The TA includes a first portion TAsAT, which is associated with a propagation delay for a signal (e.g., PUR communication 306) to be transmitted from the UE 115 to the satellite 110, and a second portion TAGnB, which is associated with a propagation delay for the signal to be transmitted from the satellite 110 to the BS 105. The UE 115 compensates for the propagation delay using TA for a UL transmission. Accordingly, if $T_0$ represents the beginning of the PUR occasion 304, the UE 115 may prepare the PUR communication 306 to be transmitted at $T_0$-TA, for example.

In some aspects, the UE 115 may determine TA based on location information provided by the satellite 110. For example, the UE 115 may monitor for global navigation satellite system (GNSS) or global positioning system (GPS) information broadcasted by the satellite 110, which may indicate a position and/or a velocity of the satellite 110 relative to the earth. The UE 115 may further determine TA based on location information of the UE 115, such as the UE's GPS location, or a position of the UE 115 relative to the satellite 110.

In addition to time-compensating for propagation delay, the UE 115 may compensate for frequency shifts due to the movement of the satellite 110 relative to the UE 115. For example, if the satellite 110 is moving quickly relative to the UE 115, the Doppler effect may cause the signal received by the satellite 110 to register as either higher in frequency (blue shift) or lower in frequency (red shift) than the signal is transmitted by the UE 115. Accordingly, the UE 115 may compensate for the frequency shift using a frequency compensation factor such that the communication signal (e.g., PUR communication 306) will be received by the satellite 110 and/or the BS 105 within the designated carriers or subcarriers indicated in the PUR configuration 302.

Before transmitting UL data in the PUR occasion 304, the UE 115 validates the PUR configuration 302. In some aspects, validating the PUR configuration 302 may increase the chances that UL communications transmitted by the UE 115 are successfully received by the satellite 110 and/or the BS 105 in the configured set of time/frequency resources associated with the PUR.

In NTN, due to the relatively large distance 120 between the satellite 110 and the UE 115, measuring signal power may not be suitable for validating the PUR configuration. For example, the signal power of communications transmitted by the satellite 110 may not vary greatly even as the satellite 110 moves outside suitable operating limits for communication with the UE 115. Accordingly, the present disclosure describes mechanisms for validating a PUR configuration based on location information of the satellite 110. In particular, the mechanisms for validating the PUR configuration may include mechanisms for validating a timing advance (TA) of communications transmitted through a satellite 110. As will be further described below, the location information may indicate position information and/or velocity information of the satellite 110. The location information may be provided with fixed coordinates, or in relative coordinates to the UE 115. In some aspects, the location information may be referred to as location-related information. For example, the location-related information may include or indicate an absolute physical location, a relative physical location, an elevation angle, velocity information, and/or time-based information associated with the satellite 110. For example, in some aspects, the UE 115 may configure a timer with a duration according to the timer configuration. The location-related information associated with the satellite 110 may include the time at which a communication is received. In another aspect, the UE 115 may determine whether the PUR configuration is valid upon an expiration of the timer. In another aspect, the location-related information may include one or more location identifiers. A location identifier may be provided by the cell in the system information. In some aspects, the location identifier may include one or more of cell identity, tracking area code, zone identity, and/or virtual cell identity.

For example, in some aspects, the UE 115 may not receive physical location data (e.g., GPS data, GNSS data) from the satellite 110. Accordingly, the TA can be calculated based on a last known location of the satellite 110. In another aspect, the UE 115 may calculate the physical location of the satellite 110 from the time the information received in system information. In other aspects, if no physical location is available, the UE 115 may determine whether to check the validity of a PUR configuration based on a configured validation timer. In some aspects, a time threshold may be configured for determining whether the PUR configuration is valid. The threshold and/or timer may be configured by RRC signaling. In other aspects, the threshold and/or timer may be broadcast using system information blocks (SIBs).

Figure 4:
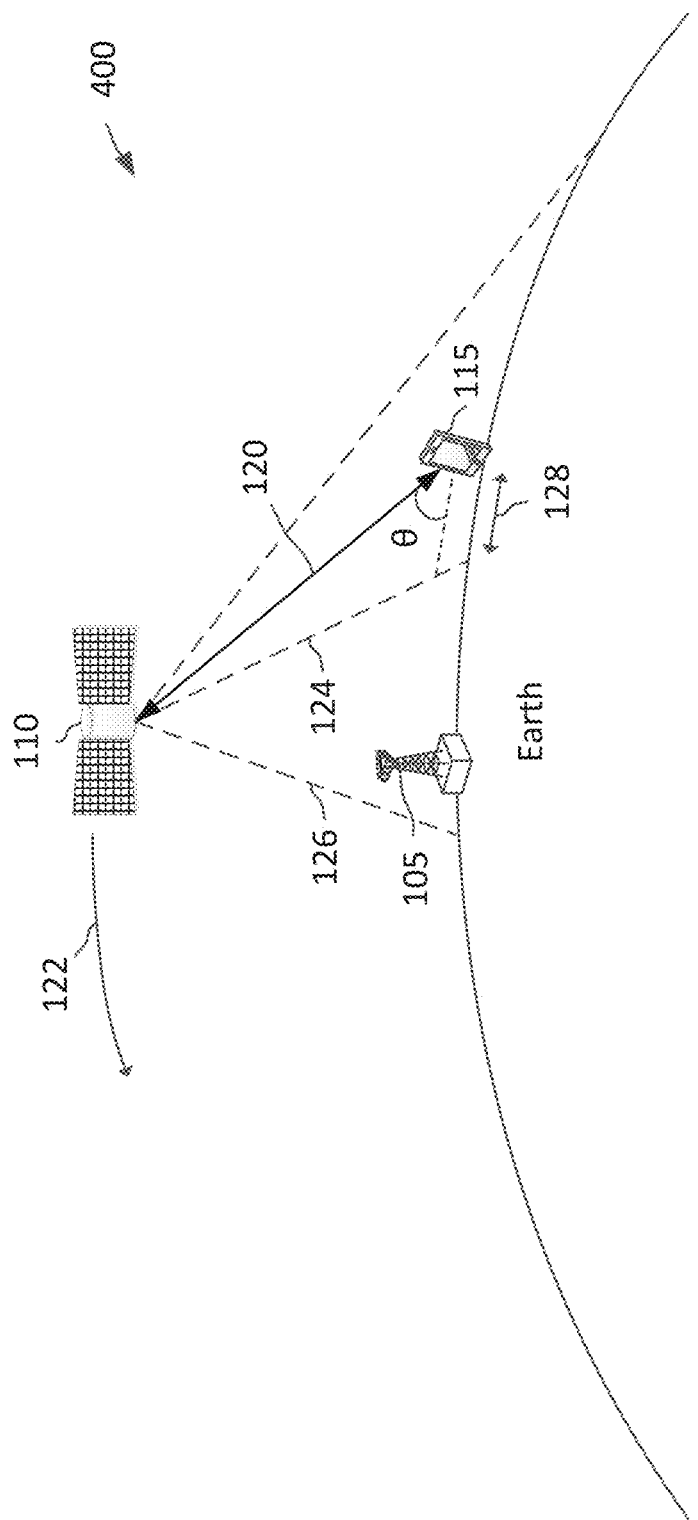
FIG. 4 illustrates a PUR communication scheme in a non-terrestrial network (NTN) according to some aspects of the present disclosure.

FIG. 4 is a diagram illustrating a PUR communication scheme 400 in a non-terrestrial network (NTN), according to some aspects of the present disclosure. The scheme 400 may be employed by BSs such as the BSs 105 and UEs such as the UEs 115 in a network such as the network 100 for communications. In particular, in the scheme 400 shown in FIG. 4, the UE 115 is configured with a PUR to transmit UL data in a PUSCH while the UE 115 is in an idle mode, as similarly explained above. A BS 105 communicates with a UE 115 through a satellite 110. Accordingly, communication sent from the base station 105 to the UE 115 are first transmitted to the satellite 110, which transmits or relays the communication to the UEs 115. The satellite 110 is shown in orbit around the earth, with the BS 105 and the UE 115 stationary, or substantially stationary, on the surface of the earth. The satellite 110 is spaced from the UE 115 by a distance 120. The satellite 110 is configured to transmit and/or receive communications using transmission beams (e.g., a directional, focused signal) and transmit and/or receive within a beam range 126 having a beam center 124. A transmission beam may cover a certain spatial angle (or beam range), and a beam center 124 may refer to a central portion of the spatial angle covered by the beam. Satellite 110 is orbiting around the earth with a velocity 122. The satellite 110 is configured to receive UL communications from the UE 115, and relay or forward the UL communications to the BS 105. Further, the satellite 110 is configured to receive DL communications from the BS 105, and relay or forward the DL communications to the UE 115.

While operating in the idle mode, the UE 115 may use one or more parameters to validate a PUR configured by a PUR configuration prior to transmitting in the PUR. For example, the UE 115 may determine or calculate a timing advance (TA) for communications to/from the satellite 110 based on a distance 120 of the satellite 110 from the UE 115. The distance 120 may be determined based on location information provided by the satellite 110 (e.g., GNSS, GPS, etc.). In some aspects, GNSS information may include a location and/or a velocity of the satellite 110. Additionally, the GNSS information may include a timestamp at which the location and/or the velocity of the satellite 110 is measured. Accordingly, the UE 115 may determine the distance 120 based on the location of the satellite 110 (provided by the GNSS information) and the location of the UE. In some other aspects, the UE 115 may determine the TA based on the timestamp indicated by the GNSS information and a time (a UE's clock time) during which the GNSS information is received. For instance, the UE 115 may compute a time difference between the timestamp and the reception or arrival time of the GNSS information. The UE 115 may compare the timing advance (TA) to a threshold. In other aspects, the UE 115 may compare the distance 120 itself to a threshold. The threshold may be a parameter of the PUR configuration. In some aspects, the threshold may be referred to as a reference value. If the TA (or distance 120) satisfies the threshold (e.g., is lower than the threshold), the UE 115 may validate the PUR configuration and proceed to transmit UL data in the following PUR occasion.

In some aspects, the UE 115 may determine a frequency compensation for communicating with the satellite 110. The frequency offset may be based on the velocity 122 of the satellite 110, for example. In other aspects, the UE 115 may determine the frequency compensation based on a position of the satellite 110. The UE 115 may calculate the frequency compensation, and compare the calculated frequency compensation to a threshold, which may be configured in the PUR configuration.

In another aspect, the UE 115 may determine a distance 128 from the beam center 124. The UE 115 may compare the distance 128 to a threshold, which may be configured in the PUR configuration. If the distance 128 satisfies the threshold (e.g., is lower than the threshold), the UE 115 may validate the PUR configuration, and proceed to transmit UL data in the following PUR occasion. In some aspects, the UE may determine the distance to the beam center based on beam position information provided by the satellite.

In another aspect, the UE 115 may determine an elevation angle θ, which is an angular position of the satellite 110 relative to the tangential surface of the earth. If 0 satisfies a threshold (e.g., is greater than the threshold), the UE 115 may validate the PUR configuration, and proceed to transmit the UL data in the PUR occasion. In some aspects, the UE 115 may determine the elevation angle based on at least one of a position of the satellite and a propagation delay between the satellite 110 and the UE 115. In some aspects, the UE 115 may determine the elevation angle further based on location and/or time information of the UE 115. In some aspects, the UE 115 may determine its own location and/or time information based on location information provided by the satellite 110, in GNSS reading, for example.

In another aspect, the UE 115 may determine a drift rate of the satellite 110, which may be associated with the velocity 122. In some aspects, the drift rate may be indicated to the UE 115 by the network (e.g., BS 105) in a SIB message, a MAC control element (MAC CE), or an RRC message. The UE 115 may calculate the drift rate, and compare the calculated drift rate to a threshold. If the drift satisfies a threshold (e.g., is greater than the threshold), the UE 115 may validate the PUR configuration, and proceed to transmit the UL data in the PUR occasion.

In some aspects, the UE 115 may use a measured signal power in combination with one or more of the parameters described above (e.g., TA, frequency offset). For example, the UE 115 may measure a reference signal received power (RSRP), reference signal received quality (RSRQ), signal-to-interference ratio (SINR), or other signal power or quality measurement of a reference signal transmitted by the BS 105 via the satellite 110 and compare the signal power or quality measurement to a corresponding threshold. The results of the comparison may be used in combination with another parameter, such that the UE 115 may validate the PUR based on comparison of the signal power or quality to a first threshold, and a comparison of another parameter (e.g., TA) to a second threshold. In some aspects, the UE 115 may validate the PUR configuration if either the signal power or quality or another parameter (e.g., TA) satisfies a corresponding threshold. Further, in some aspects, the UE 115 may use a combination of parameters, such as TA and frequency offset, to validate the PUR configuration.

In some aspects, the UE 115 may compare a determined validation parameter (e.g., TA, frequency offset) to a threshold to validate a PUR configured by the PUR configuration. The threshold or reference value may be an absolute threshold. For example, if a measured TA is less than a TA threshold, the UE 115 may validate the PUR and the UE may transmit in the PUR. If the measured TA is greater than the TA threshold, the UE 115 may determine that the PUR is invalid, and the UE may refrain from transmitting in the PUR. In other aspects, if the measured TA is greater than the TA threshold, the UE 115 may attempt to re-validate the PUR, which may include receiving updated or refreshed location information from the satellite 110 (e.g., GNSS data), calculating an updated TA, and comparing the updated TA to a threshold. In another example, if a UE's elevation angle is less than a threshold, the UE 115 may determine that the PUR configuration is invalid.

In other aspects, the UE 115 may compare a change in the validation parameter to a threshold. For example, the UE 115 may determine a change in TA from a previous TA measurement, for example, measured for a previous PUR occasion/transmission. If the change in TA since the previous PUR occasion is greater than a change threshold, the UE 115 may not validate the PUR configuration, and refrain from transmitting in the PUR. In some aspects, in response to determining that the PUR configuration is not valid, the UE may attempt to re-validate the PUR configuration by adjusting the change threshold. In another example, if the change in TA since the previous PUR occasion is lower than a change threshold, the UE 115 may validate the PUR configuration and proceed to transmit in the PUR occasion. Similarly, if a change in frequency offset exceeds a frequency offset change threshold, the UE 115 may not validate the PUR configuration. If, however, the change in TA or in frequency offset is less than the respective change threshold, the UE 115 may validate the PUR configuration for a UL data transmission in a following PUR occasion.

In another aspect, the UE 115 may be configured to update a reference value or threshold in response to determining that a determined validation parameter (e.g., TA, frequency offset) does not satisfy a threshold. For example, if the UE 115 does not validate the PUR configuration based on a GNSS reading and new satellite position estimation, the UE 115 may be configured to adjust a reference value and attempt to re-validate the PUR configuration based on the updated reference value. For example, the UE 115 may be configured to update the reference value based on a previously-determined validation parameter value (e.g., TA, change in TA, etc.), such as a most-recent validation parameter value. In one aspect, if the UE 115 determines that the PUR configuration is invalid based on a frequency offset, the UE 115 may update the threshold for the frequency offset based on previous determination or calculation of frequency offset that resulted in PUR configuration validation. In some aspects, in response to determining that a PUR configuration is invalid based on a validation parameter, the UE 115 may be configured to re-calculate the validation parameter by obtaining new or updated location information from the satellite (e.g., GNSS reading, epheremis data).

In some aspects, one or more of the thresholds and/or timers described herein may be configured using RRC signaling. In another aspect, one or more of the thresholds and/or timers described herein may be broadcast in system information, such as one or more SIB messages.

Figure 5:
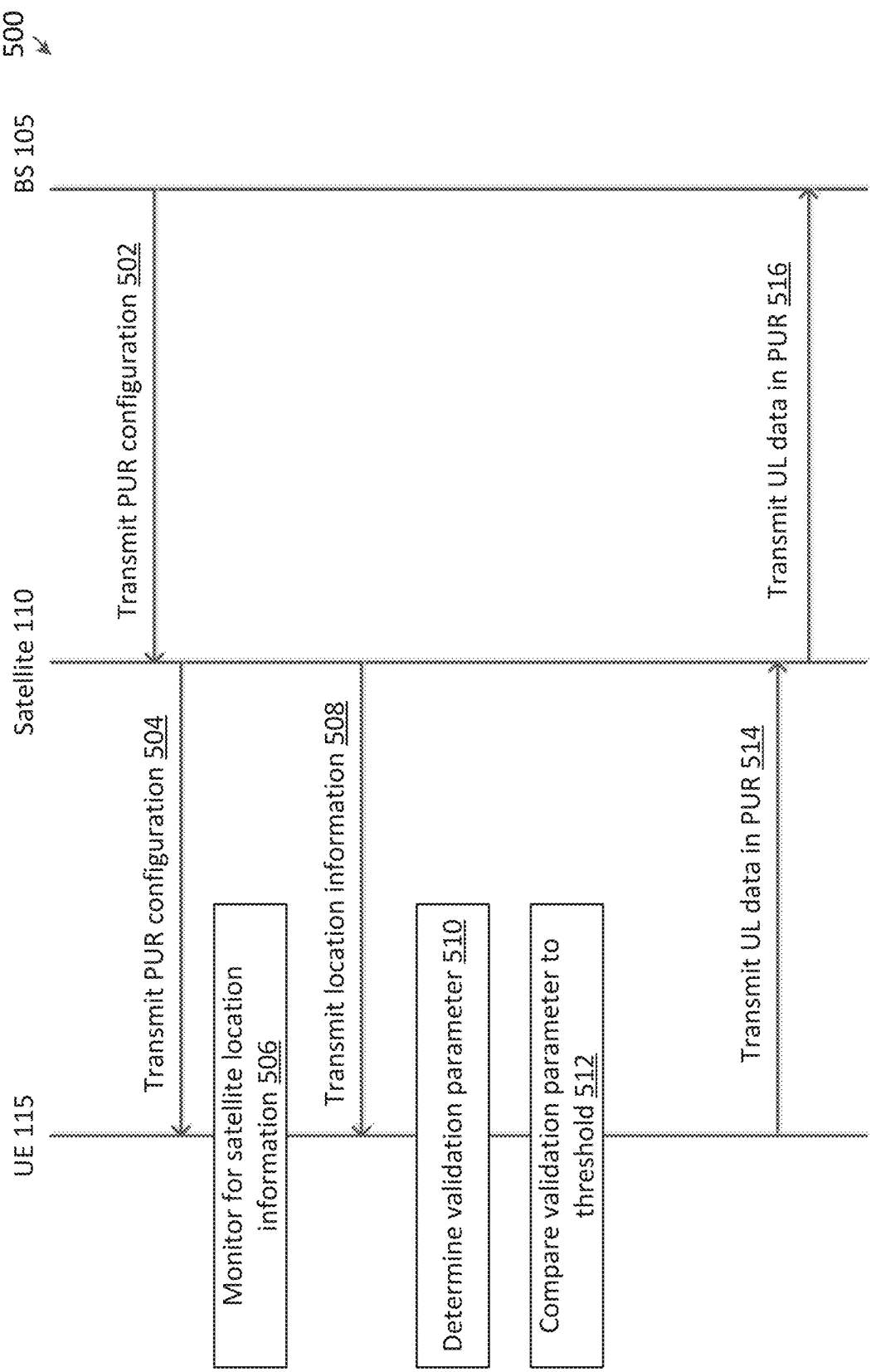
FIG. 5 is a signaling diagram of a PUR communication scheme in a NTN according to some aspects of the present disclosure.

FIG. 5 is a signaling diagram of a PUR communication scheme 500 in a NTN according to some aspects of the present disclosure. The scheme 500 is employed by a BS, 105 and a UE 115, and a satellite 110 in a network, such as the network 100 for communications. The satellite 110 is a wireless node or wireless communication device in the NTN, and is configured to relay communications between the UE 115 and the BS 105. In this regard, the satellite 110 may allow for greater coverage area in regions of the world where fixed terrestrial BSs are not present or impractical. In particular, in the scheme 500, the UE 115 is configured with a PUR to transmit UL data in a PUSCH while the UE 115 is in an idle mode, as similarly explained above.

In action 502, the BS 105 transmits a PUR configuration to the satellite 110. The PUR configuration indicates a periodic set of time/frequency resources that the UE 115 can use for UL communications while the UE 115 is in an idle mode. In particular, the time/frequency resources, which may be referred to as PUR occasions or instances, may be used by the UE 115 without performing a RACH procedure. The PUR configuration may include a plurality of PUR parameters, including the timing (symbols, slots), subcarriers, and validation criteria.

In action 504 satellite 110 transmits the PUR configuration to the UE 115. In some aspects, action 504 may be described as relaying or forwarding the PUR configuration received from the BS 105 to the UE 115.

In action 506, the UE 115 monitors for satellite location information satellite location information may be broadcast by the satellite 110 according to one or more satellite location formats are standards, such as GNSS, GPS, or any other suitable format or standard for satellite positioning information. The satellite 110 may transmit a positioning signal including the location information, which may indicate the location and/or the velocity of the satellite 110. The location information may be fixed (e.g., relative to the earth) or maybe relative to a location and/or velocity of the UE 115. The satellite location information may be transmitted in a broadcast channel.

In action 508, the satellite 110 transmits the location information. As explained above, the satellite 110 may transmit the location information in a broadcast channel (e.g., PBCH, SIB message, etc.). In some aspects, action 508 includes broadcasting a GNSS reading, which includes at least a position information of the satellite, a velocity of the satellite, and a time stamp. In some aspects, the location information further includes beam location information, which may allow the UE 115 to determine a location of the beam (e.g., beam center) relative to the UE 115. In some aspects, the location information may also be referred to as location-related information.

In action 510, the UE 115 determines a validation parameter based on the location information received in action 508. In some aspects, action 510 may include the UE 115 determining the validation parameter based on location and/or timing information of the UE 115 as well. For example, the UE 115 may determine its own location based on a GNSS reading from the satellite 110. Further, the UE 115 may determine satellite navigation timing information from the GNSS reading. The validation parameter type may be provided or indicated in the PUR configuration, and some aspects. For example, the PUR configuration may indicate or include validation criteria, which includes the validation parameter. The validation parameter may be a timing advance (TA), a frequency compensation, a drift rate of the satellite 110, and elevation angle of the satellite 110 relative to the UE 115, a distance of the UE 115 to a beam center of the satellite's beam range, a reference signal power measurement (e.g., RSRP), a distance of the UE 115 from the satellite 110, or any other suitable validation parameter or combination thereof. Accordingly, action 510 may include the UE 115 calculating a value of the validation parameter based on the location information provided by the satellite 110.

In some aspects, the UE 115 may initiate the PUR configuration validation at action 510 based on a PUR configuration validation timer configuration. For example, in some aspects, the UE 115 may configure a timer with a duration according to the timer configuration. The UE 115 may determine whether the PUR configuration is valid upon an expiration of the timer. In one example, the UE 115 may receive the PUR configuration validation timer configuration, for example, from the BS 105, and determine whether the PUR configuration is valid based at least on the timer configuration.

In action 512, the UE 115 compares the validation parameter determined or calculated in action 510 to a threshold to determine whether to validate the PUR configuration for an upcoming PUR occasion. In this regard, action 510 may include determining an absolute validation parameter value, and action 512 may include comparing the absolute validation parameter value to an absolute threshold value. In other aspects, action 510 may include determining a change in a validation parameter value from a previously-determined validation parameter value (e.g., TA of a preceding PUR occasion), and comparing the change in the validation parameter value to a validation parameter change threshold. For example, if the frequency offset determined for a PUR occasion changes by an amount that exceeds a change threshold, the UE 115 may not validate the PUR configuration.

In action 514, in response to the validation parameter satisfying the threshold and validating the PUR configuration, the UE 115 transmits UL data in a PUR occasion to the satellite 110. In some aspects, the UE 115 may transmit the UL data in a physical uplink shared channel (PUSCH) without performing a RACH procedure. Further, the UE 115 may transmit the UL data while in an idle mode. The PUR occasions may have a relatively large periodicity, such as 81.92 s or longer. The UE 115 may transmit the UL data based on the validation parameter determined in action 510, in some aspects. For example, the UE 115 may transmit the UL data based on a timing advance to compensate for the propagation delay, such that the BS 105 receives the UL data at the correct time associated with the PUR configuration. Further, the UE 115 may compensate for Doppler shifting by adjusting the frequency of the transmitted UL signals so that the UL signals are received by the satellite 110 in the correct subcarrier frequencies associated with the PUR configuration.

In some aspects, the UE 115 may determine that the PUR configuration associated with action 514 is not valid. In this regard, the UE 115 may consider the PUR occasion as "skipped." In other words, the UE 115 may determine that the PUR configuration will be skipped such that the UE 115 does not communicate in the PUR occasion.

In action 516, the satellite 110 transmits the UL data to the BS 105 in the PUR. In some aspects, transmitting the UL data to the BS 105 may be referred to as relaying the data to the BS 105.

Figure 6:
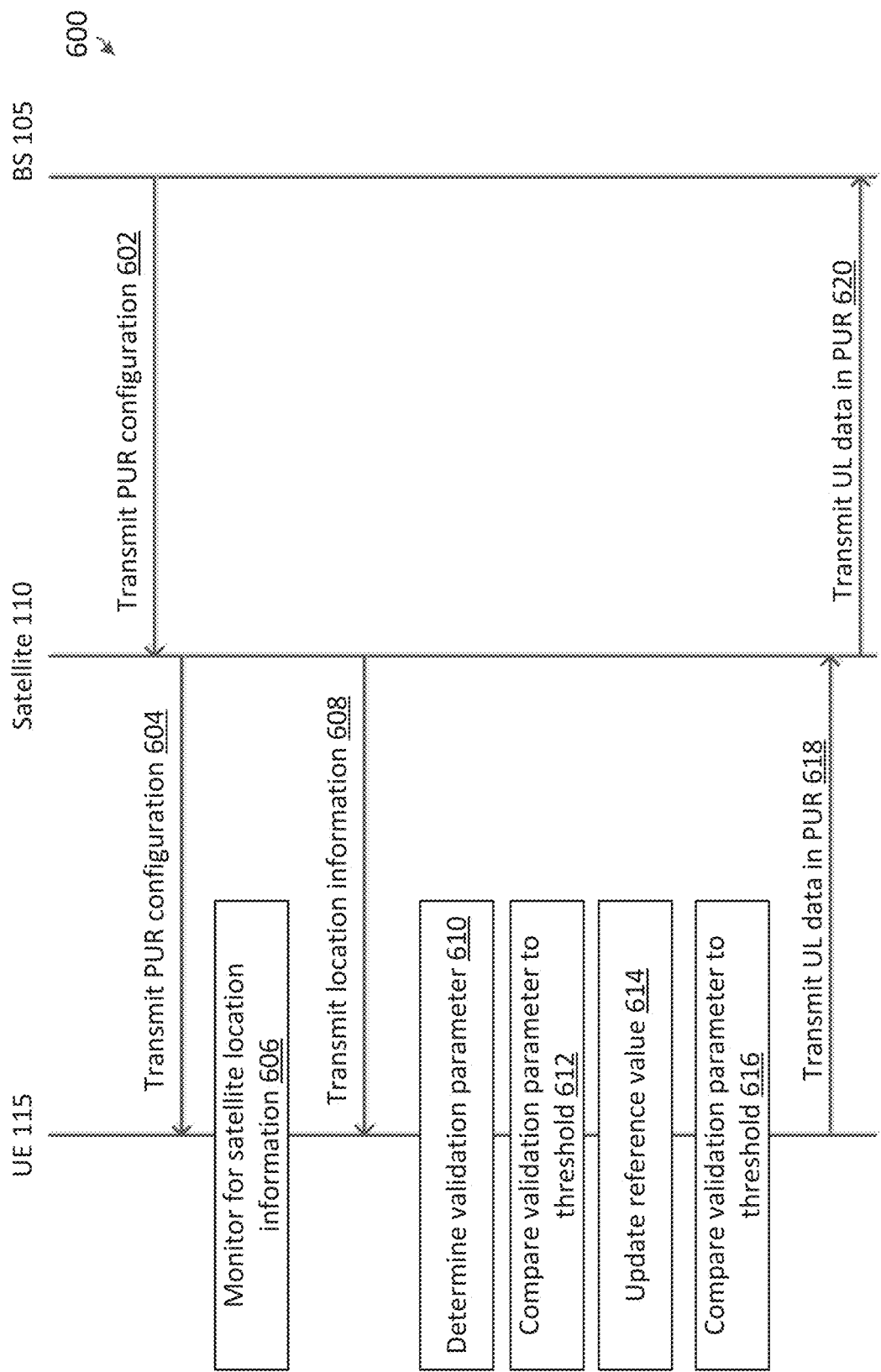
FIG. 6 is a signaling diagram of a PUR communication scheme in a NTN according to some aspects of the present disclosure.

FIG. 6 is a signaling diagram of a PUR communication scheme 600 in a NTN according to some aspects of the present disclosure. The scheme 600 is employed by a BS, 105 and a UE 115, and a satellite 110 in a network, such as the network 100 for communications. In the scheme 600, the UE 115 is configured to correct a reference value or threshold in response to determining that a PUR configuration is invalid.

In action 602, the BS 105 transmits a PUR configuration to the satellite 110. The PUR configuration indicates a periodic set of time/frequency resources that the UE 115 can use for UL communications while the UE 115 is in an idle mode. In particular, the time/frequency resources, which may be referred to as PUR occasions or instances, may be used by the UE 115 without performing a RACH procedure. The PUR configuration may include a plurality of PUR parameters, including the timing (symbols, slots), subcarriers, and validation criteria.

In action 604 satellite 110 transmits the PUR configuration to the UE 115. In some aspects, action 604 may be described as relaying or forwarding the PUR configuration received from the BS 105 to the UE 115.

In action 606, the UE 115 monitors for satellite location information satellite location information may be broadcast by the satellite 110 according to one or more satellite location formats are standards, such as GNSS, GLONASS, GPS, or any other suitable format or standard for satellite positioning information. The location information may indicate the location and/or the velocity of the satellite 110. The location information may be fixed (e.g., relative to the earth) or maybe relative to a location and/or velocity of the UE 115. The satellite location information may be transmitted in a broadcast channel.

In action 608, the satellite 110 transmits the location information. As explained above, the satellite 110 may transmit the location information in a broadcast channel.

In action 610, the UE 115 determines a validation parameter based on the location information received in action 608. The validation parameter may be provided or indicated in the PUR configuration, and some aspects. For example, the PUR configuration may indicate or include validation criteria, which includes the validation parameter. The validation parameter may be a timing advance (TA), a frequency offset, a drift rate of the satellite 110, and elevation angle of the satellite 110 relative to the UE 115, a distance of the UE 115 to a beam center of the satellite's beam range, a reference signal power measurement (e.g., RSRP), a distance of the UE 115 from the satellite 110, or any other suitable validation parameter or combination thereof. Accordingly, action 610 may include the UE 115 calculating a value of the validation parameter based on the location information provided by the satellite 110.

In action 612, the UE 115 compares the validation parameter determined or calculated in action 510 to a threshold to determine whether to validate the PUR configuration for an upcoming PUR occasion. In this regard, action 610 may include determining an absolute validation parameter value, and action 612 may include comparing the absolute validation parameter value to an absolute threshold value. In other aspects, action 510 may include determining a change in a validation parameter value from a previously-determined validation parameter value (e.g., TA of a preceding PUR occasion), and comparing the change in the validation parameter value to a validation parameter change threshold. For example, if the frequency offset determined for a PUR occasion changes by an amount that exceeds a change threshold, the UE 115 may not validate the PUR configuration.

In action 614, in response to the validation parameter not satisfying the threshold, and determining that the PUR configuration is invalid, the UE 115 is configured to adjust the threshold or reference value used for determining whether the PUR configuration is invalid. For example, in some aspects, the UE 115 may adjust the threshold value based on a previously successful PUR validation, in which the validation parameter value satisfied the threshold. For example, the UE 115 may change the threshold value to be the previously determined validation parameter value that resulted in the PUR configuration validation.

In other aspects, action 614 may include, instead of or in addition to the steps described above, obtaining new location information from the satellite 110 to recalculate the validation parameter value. Based on the new location information, the UE 115 may compare the updated validation parameter value to the threshold to determine whether the PUR configuration is valid. If the updated validation parameter value still does not satisfy the threshold, the UE 115 may determine that the PUR configuration is invalid.

In action 616, the UE 115 compares the validation parameter value to the updated threshold value, which was updated in action 614. If the validation parameter value satisfies the updated threshold, the UE 115 can validate the PUR configuration. If the validation parameter does not satisfy the updated threshold, the UE 115 may obtain updated location information from the satellite, or may determine that the PUR configuration is invalid. In some aspects, in response to determining that the PUR configuration is invalid, the UE 115 may initiate a RACH process to request time/frequency resources for transmitting the UL data.

In action 618, in response to the validation parameter satisfying the updated threshold, the UE 115 transmits UL data in a PUR occasion to the satellite 110. In some aspects, the UE 115 may transmit the UL data in a physical uplink shared channel (PUSCH) without performing a RACH procedure. Further, the UE 115 may transmit the UL data while in an idle mode. The PUR occasions may have a relatively large periodicity, such as 81.92 s or longer. The UE 115 may transmit the UL data based on the validation parameter determined in action 510, in some aspects. For example, the UE 115 may transmit the UL data based on a timing advance to compensate for the propagation delay, such that the BS 105 receives the UL data at the correct time associated with the PUR configuration. Further, the UE 115 may compensate for Doppler shifting by adjusting the frequency of the transmitted UL signals so that the UL signals are received by the satellite 110 in the correct subcarrier frequencies associated with the PUR configuration.

In action 620, the satellite 110 transmits the UL data to the BS 105 in the PUR. In some aspects, transmitting the UL data to the BS 105 may be referred to as relaying the data to the BS 105.

Figure 7:
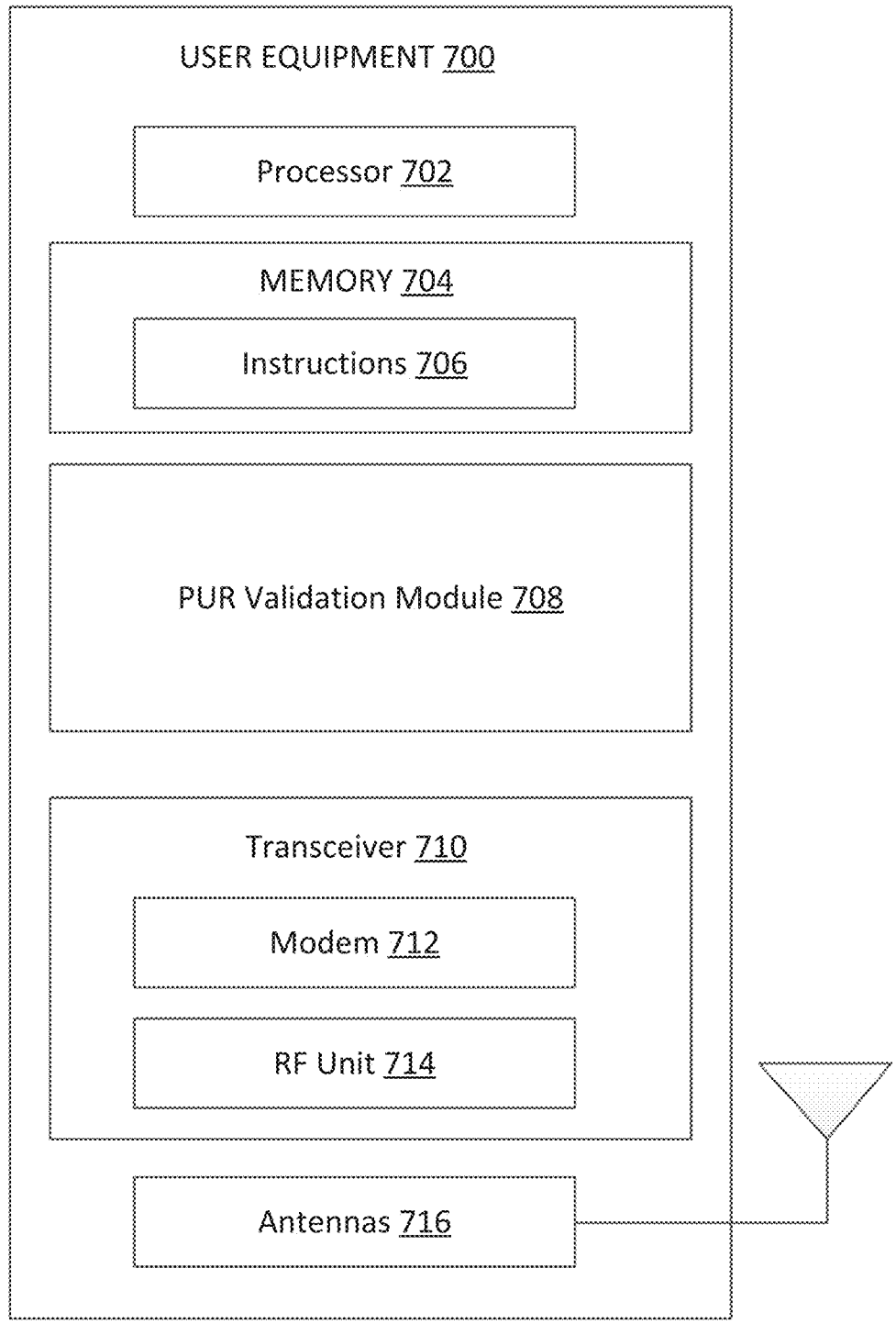
FIG. 7 is a block diagram of a user equipment (UE) according to some aspects of the present disclosure.

FIG. 7 is a block diagram of an exemplary UE 700 according to some aspects of the present disclosure. The UE 700 may be a UE 115 discussed above in FIG. 1. As shown, the UE 700 may include a processor 702, a memory 704, an PUR Validation Module 708, a transceiver 710 including a modem subsystem 712 and a radio frequency (RF) unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 3-6 and 10. Instructions 706 may also be referred to as program code. The program code may be for causing a wireless communication device to perform these operations, for example by causing one or more processors (such as processor 702) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PUR Validation Module 708 may be implemented via hardware, software, or combinations thereof. For example, the PUR Validation Module 708 may be implemented as a processor, circuit, and/or instructions 706 stored in the memory 704 and executed by the processor 702. In some instances, the PUR Validation Module 708 can be integrated within the modem subsystem 712. For example, the PUR Validation Module 708 can be implemented by a combination of software components (e.g., executed by a DSP or a general processor) and hardware components (e.g., logic gates and circuitry) within the modem subsystem 712.

The PUR Validation Module 708 is configured to determine, based on location information of a satellite in a non-terrestrial network (NTN), whether a preconfigured uplink resource (PUR) configuration is valid. In some aspects, the PUR Validation Module 708 is configured to determine whether the PUR configuration is valid further based on location information of the UE 700. For example, in some aspects, the processor 702 and/or the PUR Validation Module 708 is configured to determine a location of the UE based on a GNSS reading from the satellite. In some aspects, the PUR Validation Module 708 is configured to determine, based on at least one of a position or satellite time information (e.g., provided in GNSS reading), whether a timing advance for transmitting the communication signal to the BS in the PUR satisfies a threshold. In some aspects, the PUR Validation Module 708 is configured to determine, based on at least one of a position or a velocity of the satellite, whether a frequency offset satisfies a threshold. In some aspects, the PUR Validation Module 708 is configured to determine, based on at least one of a position or a velocity of the satellite, whether a distance between the UE and a transmission beam associated with the satellite satisfies a threshold. In some aspects, the PUR Validation Module 708 is configured to determine, based on at least one of a position or a velocity of the satellite, whether an elevation angle associated with the UE and the satellite satisfies a threshold. In some aspects, the PUR Validation Module 708 is configured to determine whether the PUR configuration is valid based on a received signal power associated with a reference signal. In some aspects, the PUR Validation Module 708 is configured to determine, based on at least one of a position or a velocity of the satellite, whether a drift rate of the satellite satisfies a threshold. In some aspects, the PUR Validation Module 708 is configured to determine, based on the location information of the satellite, a validation parameter, and comparing the validation parameter to a threshold. In some aspects, the PUR Validation Module 708 is configured to determine, based on the location information of the satellite, a validation parameter, and compare a difference between the validation parameter and a previous validation parameter to a threshold.

The PUR Validation Module 708 is further configured to transmit, to a base station (BS) via the satellite in response to determining that the PUR configuration is valid, a communication signal in a PUR. In some aspects, the PUR Validation Module 708 is further configured to adjust, in response to determining that the PUR configuration is not valid, a threshold, and determining, based on the threshold, whether the PUR configuration is valid. In some aspects, the PUR Validation Module 708 is further configured to receive, from the satellite, a positioning signal indicating the location information of the satellite. In some aspects, the PUR Validation Module 708 is further configured to receive a threshold configuration, and determine whether the PUR configuration is valid based on the threshold configuration. For example, the threshold configuration may include one or more thresholds for comparing a validation parameter (e.g., timing advance, drift rate, elevation angle), to a corresponding threshold. In some aspects, the PUR Validation Module 708 is further configured to receive a PUR configuration validation timer configuration, and determine whether the PUR configuration is valid further based on the timer configuration.

As shown, the transceiver 710 may include the modem subsystem 712 and the RF unit 714. The transceiver 710 can be configured to communicate bi-directionally with other devices, such as the BSs 105. The modem subsystem 712 may be configured to modulate and/or encode the data from the memory 704 and/or the PUR Validation Module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PUCCH control information, PRACH signals, PUSCH data) from the modem subsystem 712 (on outbound transmissions) or of transmissions originating from another source such as another UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., DCI, SSBs, RMSI, MIB, SIB, MAC CE, RRC message, PUR configurations) to the PUR Validation Module 708 for processing. The antennas 716 may include multiple antennas of similar or different designs in order to sustain multiple transmission links. The RF unit 714 may configure the antennas 716.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

Figure 8:
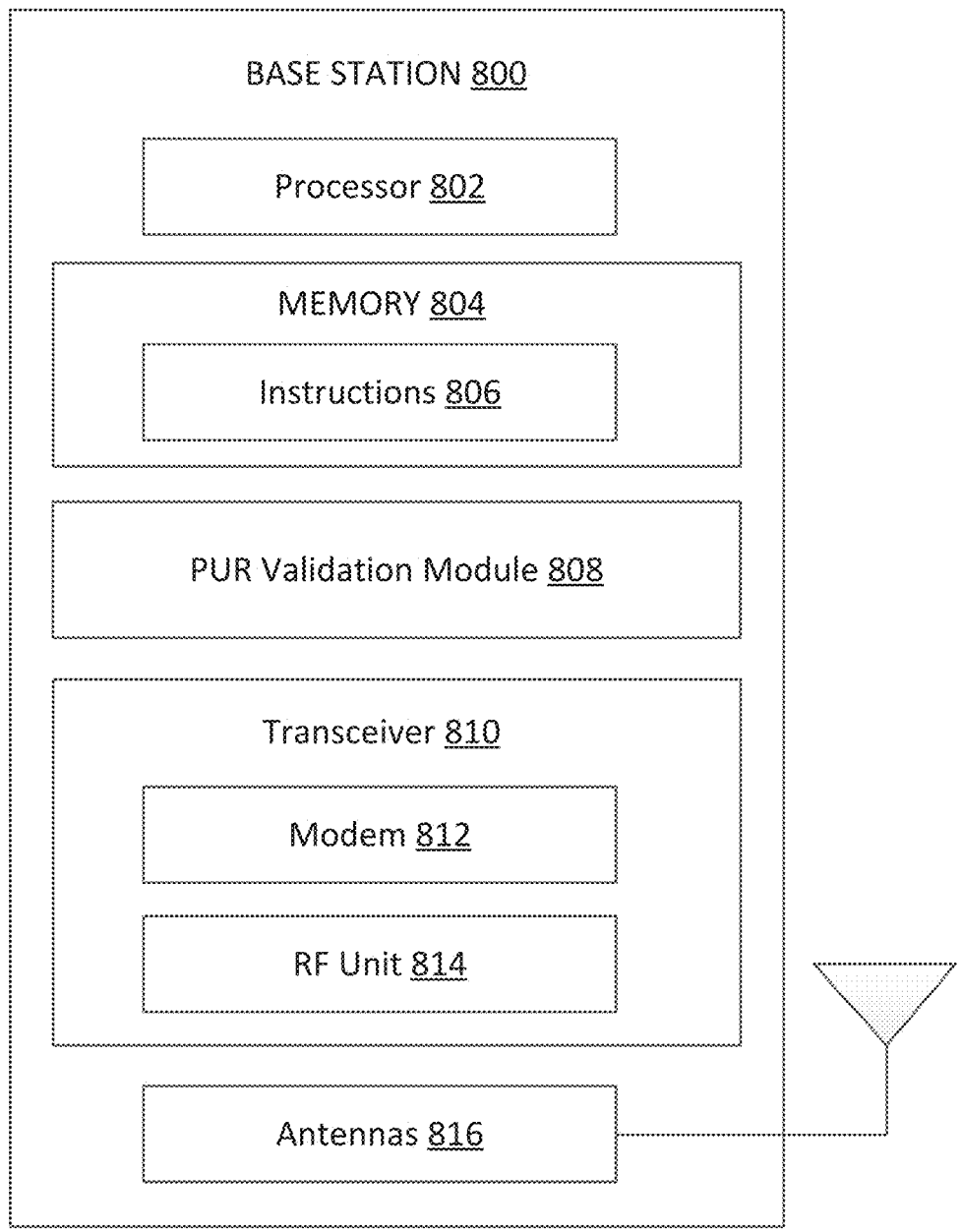
FIG. 8 is a block diagram of an exemplary base station (BS) according to some aspects of the present disclosure.

FIG. 8 is a block diagram of an exemplary BS 800 according to some aspects of the present disclosure. The BS 800 may be a BS 105 in the network 100 as discussed above in FIG. 1. A shown, the BS 800 may include a processor 802, a memory 804, an PUR Validation Module 808, a transceiver 810 including a modem subsystem 812 and a RF unit 814, and one or more antennas 816. These elements may be coupled with one another. The term "coupled" may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 3-6. Instructions 806 may also be referred to as code, which may be interpreted broadly to include any type of computer-readable statement(s) as discussed above.

The PUR Validation Module 808 may be implemented via hardware, software, or combinations thereof. For example, the PUR Validation Module 808 may be implemented as a processor, circuit, and/or instructions 806 stored in the memory 804 and executed by the processor 802. In some instances, the PUR Validation Module 808 can be integrated within the modem subsystem 812. For example, the PUR Validation Module 808 can be implemented by a combination of software components (e.g., executed by a DSP or a general processor) and hardware components (e.g., logic gates and circuitry) within the modem subsystem 812.

The PUR Validation Module 808 is configured to configure a UE, such as one of the UEs 115, with a PUR communication scheme, including validation criteria. The PUR configuration may include a plurality of parameters, including the first slot and/or symbol of a PUR occasion, subcarrier frequencies, periodicity, and/or any other suitable parameter. The PUR configuration may also indicate to the UE one or more types of validation parameters, such as timing advance (TA), frequency offset, distance to beam center, drift rate, or any other suitable type of parameter. The PUR configuration may also indicate to the UE one or more thresholds or reference values for validating the PUR configuration based on the calculated validation parameter.

As shown, the transceiver 810 may include the modem subsystem 812 and the RF unit 814. The transceiver 810 can be configured to communicate bi-directionally with other devices, such as the UEs 115 and/or 800, another BS 105, and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., SSBs, RMSI, MIB, SIB, FBE configuration, PRACH configuration PDCCH, PDSCH, MAC CE, RRC message, PUR configurations) from the modem subsystem 812 (on outbound transmissions) or of transmissions originating from another source, such as a UE 115. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 105 to enable the BS 105 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., PUCCH control information, PRACH signals, PUSCH data) to the PUR Validation Module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Figure 9:
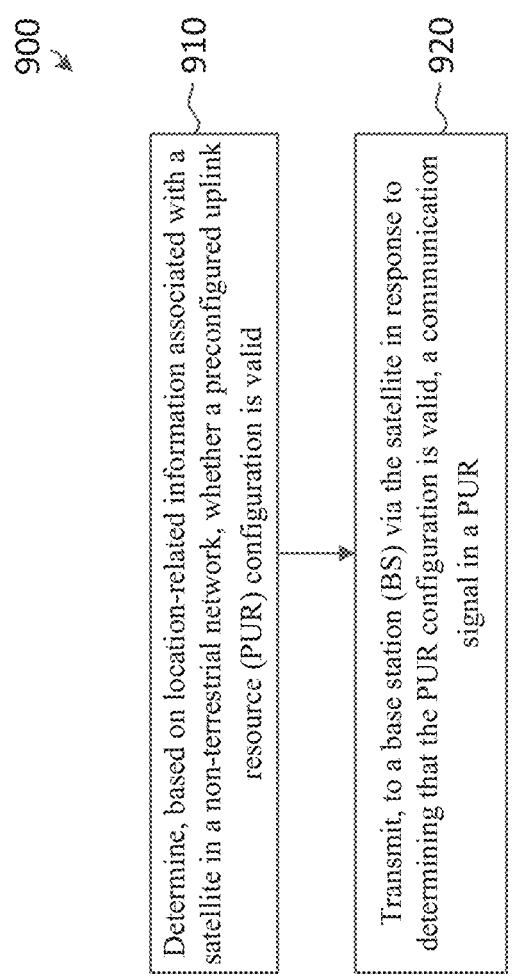
FIG. 9 is a flow diagram of a communication method according to some aspects of the present disclosure.

FIG. 9 is a flow diagram of a communication method 900 according to some aspects of the present disclosure. Steps of the method 900 can be executed by a computing device (e.g., a processor, processing circuit, and/or other suitable component) of an apparatus or other suitable means for performing the steps. For example, a UE, such as UEs 115 may utilize one or more components, such as the processor 702, the memory 704, the PUR Validation Module 708, the transceiver 710, and the one or more antennas 716, to execute the steps of method 900. The method 900 may employ similar mechanisms as described in FIGS. 3-6. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the UE determines, based on location information of a satellite in a non-terrestrial network (NTN), whether a preconfigured uplink resource (PUR) configuration is valid. In some aspects, determining whether the PUR configuration is valid includes determining, based on at least one of a position of the satellite or satellite navigation timing information (e.g., timing information provided in a GNSS reading), whether a timing advance for transmitting the communication signal to the BS in the PUR satisfies a threshold. In some aspects, the UE determines whether the PUR configuration is valid based on location information of the UE. For example, in some aspects, the UE may be configured to determine its location based on a GNSS reading, a propagation delay, or any other suitable type of location information from the satellite. In some aspects, determining whether the PUR configuration is valid includes determining, based on a position of the satellite, whether a frequency compensation satisfies a threshold. In some aspects, determining whether the PUR configuration is valid includes determining, based on beam position information of the satellite, whether a distance between the UE and a transmission beam associated with the satellite satisfies a threshold. In some aspects, determining whether the PUR configuration is valid includes determining, based on at least one of a position or a propagation delay of the satellite, whether an elevation angle associated with the UE and the satellite satisfies a threshold. In some aspects, determining whether the PUR configuration is valid includes determining whether the PUR configuration is valid based on a received signal power associated with a reference signal. In some aspects, determining whether the PUR configuration is valid includes determining, based on at least one of a position or a time stamp of the location information of the satellite, whether a drift rate of the satellite satisfies a threshold. In some aspects, determining whether the PUR configuration is valid includes determining, based on the location information of the satellite, a validation parameter, and comparing the validation parameter to a threshold. In some aspects, determining that the PUR configuration is valid includes determining, based on the location information of the satellite, a validation parameter, and comparing a difference between the validation parameter and a reference validation parameter to a threshold. In some aspects, the UE may utilize one or more components, such as the processor 702, the memory 704, the PUR Validation Module 708, the transceiver 710, and the one or more antennas 716, to perform the operations at block 910.

At block 920, the UE transmits, to a base station (BS) via the satellite in response to determining that the PUR configuration is valid, a communication signal in a PUR. In some aspects, the UE may utilize one or more components, such as the processor 702, the memory 704, the PUR Validation Module 708, the transceiver 710, and the one or more antennas 716, to perform the operations at block 920.

In some aspects, the method 900 further includes adjusting, in response to determining that the PUR configuration is not valid, a threshold, and determining, based on the threshold, whether the PUR configuration is valid. In some aspects, the method 900 further includes receiving, from the satellite, a positioning signal indicating the location information of the satellite. In some aspects, the method 900 further includes receiving a threshold configuration, and the determining whether the PUR configuration is valid is further based on the threshold configuration. In some aspects, the method 900 further includes receiving a PUR configuration validation timer configuration, where the determining whether the PUR configuration is valid is further based on the timer configuration.

Aspects of the present disclosure include the following:

1. A method for wireless communication performed by a user equipment (UE), the method comprising:
   determining, based on location-related information associated with a satellite in a non-terrestrial network, whether a preconfigured uplink resource (PUR) configuration is valid; and
   transmitting, to a base station (BS) via the satellite in response to determining that the PUR configuration is valid, a communication signal in a PUR.

2. The method of clause 1, wherein the determining whether the PUR configuration is valid is further based on:
   location information of the UE.

3. The method of any of clauses 1-2, wherein the determining whether the PUR configuration is valid comprises:
   determining, based on at least one of a position of the satellite or satellite navigation timing information, whether a timing advance for transmitting the communication signal to the BS in the PUR satisfies a threshold.

4. The method of any of clauses 1-3, wherein the determining whether the PUR configuration is valid comprises:
   determining, based on a position of the satellite, whether a frequency compensation satisfies a threshold.

5. The method of any of clauses 1-4, wherein the determining whether the PUR configuration is valid comprises:
   determining, based on beam position information of the satellite, whether a distance between the UE and a transmission beam associated with the satellite satisfies a threshold.

6. The method of any of clauses 1-5, wherein the determining whether the PUR configuration is valid comprises:
   determining, based on at least one of a position or a propagation delay of the satellite, whether an elevation angle associated with the UE and the satellite satisfies a threshold.

7. The method of any of clauses 1-6, wherein the determining whether the PUR configuration is valid comprises:

determining whether the PUR configuration is valid based on a received signal power associated with a reference signal.
8. The method of any of clauses 1-7, wherein the determining whether the PUR configuration is valid comprises:
determining, based on at least one of a position or a velocity or a time stamp of the location information of the satellite, whether a drift rate of the satellite satisfies a threshold.
8. The method of claim 1, wherein the determining whether the PUR configuration is valid comprises:
determining a location identifier associated with the PUR configuration; and
comparing the location identifier provided by the cell in the system information, the location identifier comprising one or more of cell identity, tracking area code, zone identity and virtual cell identity.
9. The method of claim 1, further comprising:
determining, in response to determining that the PUR configuration is not valid, that a PUR occasion is skipped.
9. The method of any of clauses 1-8, wherein the determining whether the PUR configuration is valid comprises:
determining a validation parameter; and
comparing the validation parameter to a threshold.
10. The method of any of clauses 1-8, wherein the determining that the PUR configuration is valid comprises:
determining a validation parameter; and
comparing a difference between the validation parameter and a reference validation parameter to a threshold.
11. The method of any of clauses 1-10, further comprising:
adjusting, in response to determining that the PUR configuration is not valid, a threshold; and
determining, based on the threshold, whether the PUR configuration is valid.
12. The method of any of clauses 1-11, further comprising:
receiving, from the satellite, a positioning signal indicating the location information of the satellite.
13. The method of any of clauses 1-12, further comprising:
receiving a PUR configuration validation timer configuration, and
wherein the determining whether the PUR configuration is valid is further based on the timer configuration.
14. The method of any of clauses 1-13, further comprising:
receiving a threshold configuration,
wherein the determining whether the PUR configuration is valid is further based on the threshold configuration.
15. The method of any of clauses 1-14, further comprising:
determining, in response to determining that the PUR configuration is not valid, that a PUR occasion is skipped.
16. A method for wireless communication performed by a base station (BS), the method comprising:
transmitting, to a user equipment (UE) via a satellite, a preconfigured uplink resource configuration (PUR);
receiving, from the UE via the satellite based on the PUR configuration being validated by location information associated with the satellite, a communication signal in a PUR.
17. The method of aspect 16, further comprising:
transmitting, to the UE via the satellite, one or more PUR validation parameters for validating the PUR configuration.
18. A user equipment (UE), comprising:
a memory; and
a processor coupled with the memory and configured to, when executing instructions stored on the memory, to cause the UE to perform the actions of any of clauses 1-15.
19. A base station (BS), comprising:
a memory; and
a processor coupled with the memory and configured to, when executing instructions stored on the memory, to cause the BS to perform the actions of any of clauses 16-17.
20. A non-transitory, computer-readable medium having program code recorded therein, wherein the program code comprises instructions executable by a processor of a user equipment (UE) to cause the UE to perform the actions of any of clauses 1-15.
21. A non-transitory, computer-readable medium having program code recorded therein, wherein the program code comprises instructions executable by a processor of a base station (BS) to cause the BS to perform the actions of any of clauses 16-17.
22. A user equipment (UE) comprising means for performing the actions of any of clauses 1-15.
23. A base station (BS) comprising means for performing the actions of any of clauses 16-17.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method for wireless communication performed by a user equipment (UE), the method comprising:
    determining, based on a comparison between a threshold and location-related information associated with a satellite in a non-terrestrial network, whether a preconfigured uplink resource (PUR) configuration is valid;
    in response to determining the PUR configuration is valid, transmitting, to a base station (BS) via the satellite, a communication signal in a PUR; and
    in response to determining the PUR configuration is invalid:
        adjusting, based on updated location-related information associated with the satellite, the threshold; and
        determining, based on the threshold as adjusted, whether the PUR configuration is valid.

2. The method of claim 1, wherein the determining whether the PUR configuration is valid comprises:
    determining, based on at least one of a position of the satellite or satellite navigation timing information, whether a timing advance for transmitting the communication signal to the BS in the PUR satisfies the threshold.

3. The method of claim 1, wherein the determining whether the PUR configuration is valid comprises:
    determining, based on a position of the satellite, whether a frequency compensation satisfies the threshold.

4. The method of claim 1, wherein the determining whether the PUR configuration is valid comprises:
    determining, based on beam position information of the satellite, whether a distance between the UE and a transmission beam associated with the satellite satisfies the threshold.

5. The method of claim 1, wherein the determining whether the PUR configuration is valid comprises:
    determining, based on at least one of a position or a propagation delay of the satellite, whether an elevation angle associated with the UE and the satellite satisfies the threshold.

6. The method of claim 1, wherein the determining whether the PUR configuration is valid comprises:
    determining whether the PUR configuration is valid based on a received signal power associated with a reference signal.

7. The method of claim 1, wherein the determining whether the PUR configuration is valid comprises:
    determining, based on at least one of a position or a velocity or a time stamp of the location-related information associated with the satellite, whether a drift rate of the satellite satisfies the threshold.

8. The method of claim 1, wherein the determining whether the PUR configuration is valid comprises:
    determining a location identifier associated with the PUR configuration; and
    comparing the location identifier provided by a cell in system information, the location identifier comprising one or more of cell identity, tracking area code, zone identity and virtual cell identity.

9. The method of claim 1, further comprising:
    determining, in response to determining that the PUR configuration is not valid, that a PUR occasion is skipped.

10. A user equipment (UE), comprising:
    a memory;
    a transceiver; and
    a processor coupled with the memory and configured to, when executing instructions stored on the memory, to cause the UE to:
        determine, based on a comparison between a threshold and location-related information associated with a satellite in a non-terrestrial network, whether a preconfigured uplink resource (PUR) configuration is valid;
        in response to determining the PUR configuration is valid, transmit, via the transceiver to a base station (BS) via the satellite, a communication signal in a PUR; and
        in response to determining the PUR configuration is invalid;
        adjust, based on updated location-related information associated with the satellite, the threshold; and
        determine, based on the threshold as adjusted, whether the PUR configuration is valid.

11. The UE of claim 10, wherein the processor configured to cause the UE to determine whether the PUR configuration is valid comprises the processor configured to cause the UE to:
    determine, based on at least one of a position of the satellite or satellite navigation timing information, whether a timing advance for transmitting the communication signal to the BS in the PUR satisfies the threshold.

12. The UE of claim 10, wherein the processor configured to cause the UE to determine whether the PUR configuration is valid comprises the processor configured to cause the UE to:
    determine, based on a position of the satellite, whether a frequency compensation satisfies the threshold.

13. The UE of claim 10, wherein the processor configured to cause the UE to determine whether the PUR configuration is valid comprises the processor configured to cause the UE to:
    determine, based on beam position information of the satellite, whether a distance between the UE and a transmission beam associated with the satellite satisfies the threshold.

14. The UE of claim 10, wherein the processor configured to cause the UE to determine whether the PUR configuration is valid comprises the processor configured to cause the UE to:

determine, based on at least one of a position or a propagation delay of the satellite, whether an elevation angle associated with the UE and the satellite satisfies the threshold.

15. The UE of claim 10, wherein the processor configured to cause the UE to determine whether the PUR configuration is valid comprises the processor configured to cause the UE to:
determine whether the PUR configuration is valid based on a received signal power associated with a reference signal.

16. The UE of claim 10, wherein the processor configured to cause the UE to determine whether the PUR configuration is valid comprises the processor configured to cause the UE to:
determine, based on at least one of a position or a velocity or a time stamp of the location-related information associated with the satellite, whether a drift rate of the satellite satisfies the threshold.

17. The UE of claim 10, wherein the processor configured to determine whether the PUR configuration is valid comprises the processor configured to cause the UE to:
determine a location identifier associated with the PUR configuration; and
compare the location identifier provided by a cell in system information, the location identifier comprising one or more of cell identity, tracking area code, zone identity and virtual cell identity.

18. The UE of claim 10, wherein the processor is further configured to cause the UE to:
determine, in response to determining that the PUR configuration is not valid, that a PUR occasion is skipped.

19. A non-transitory computer-readable medium having program code recorded thereon, the program code comprising:
code for causing a user equipment (UE) to determine, based on a comparison between a threshold and location-related information associated with a satellite in a non-terrestrial network, whether a preconfigured uplink resource (PUR) configuration is valid;
code for causing the UE, in response to determining the PUR configuration is valid, to transmit, to a base station (BS) via the satellite, a communication signal in a PUR; and
code for causing the UE, in response to determining the PUR configuration is invalid, to:
adjust, based on updated location-related information associated with the satellite, the threshold; and
determine, based on the threshold as adjusted, whether the PUR configuration is valid.

20. A user equipment (UE), comprising:
means for determining, based on a comparison between a threshold and location-related information associated with a satellite in a non-terrestrial network, whether a preconfigured uplink resource (PUR) configuration is valid;
means for transmitting, to a base station (BS) via the satellite in response to determining the PUR configuration is valid, a communication signal in a PUR; and
means for adjusting, in response to determining the PUR configuration is invalid, the threshold, wherein the means for adjusting the threshold is based on updated location-related information associated with the satellite; and
means for determining, in response to determining the PUR configuration is invalid, whether the PUR configuration is valid based on the threshold as adjusted.

21. The UE of claim 20, wherein the means for determining whether the PUR configuration is valid comprises:
means for determining, based on at least one of a position of the satellite or satellite navigation timing information, whether a timing advance for transmitting the communication signal to the BS in the PUR satisfies the threshold.

22. The UE of claim 20, wherein the means for determining whether the PUR configuration is valid comprises:
means for determining, based on a position of the satellite, whether a frequency compensation satisfies the threshold.

23. The UE of claim 20, wherein the means for determining whether the PUR configuration is valid comprises:
means for determining, based on beam position information of the satellite, whether a distance between the UE and a transmission beam associated with the satellite satisfies the threshold.

24. The UE of claim 20, wherein the means for determining whether the PUR configuration is valid comprises:
means for determining, based on at least one of a position or a propagation delay of the satellite, whether an elevation angle associated with the UE and the satellite satisfies the threshold.

25. The UE of claim 20, wherein the means for determining whether the PUR configuration is valid comprises:
means for determining whether the PUR configuration is valid based on a received signal power associated with a reference signal.

26. The UE of claim 20, wherein the means for determining whether the PUR configuration is valid comprises:
means for determining, based on at least one of a position or a velocity or a time stamp of the location-related information associated with the satellite, whether a drift rate of the satellite satisfies the threshold.

27. The UE of claim 20, wherein the means for determining whether the PUR configuration is valid comprises:
means for determining a location identifier associated with the PUR configuration; and
means for comparing the location identifier provided by a cell in system information, the location identifier comprising one or more of cell identity, tracking area code, zone identity and virtual cell identity.

28. The UE of claim 20, further comprising:
means for determining, in response to determining that the PUR configuration is not valid, that a PUR occasion is skipped.

* * * * *